Feb. 18, 1969  P. C. BERTELSON ET AL  3,428,362
SEAT BELT UTILIZATION INDICATOR
Filed Oct. 16, 1967
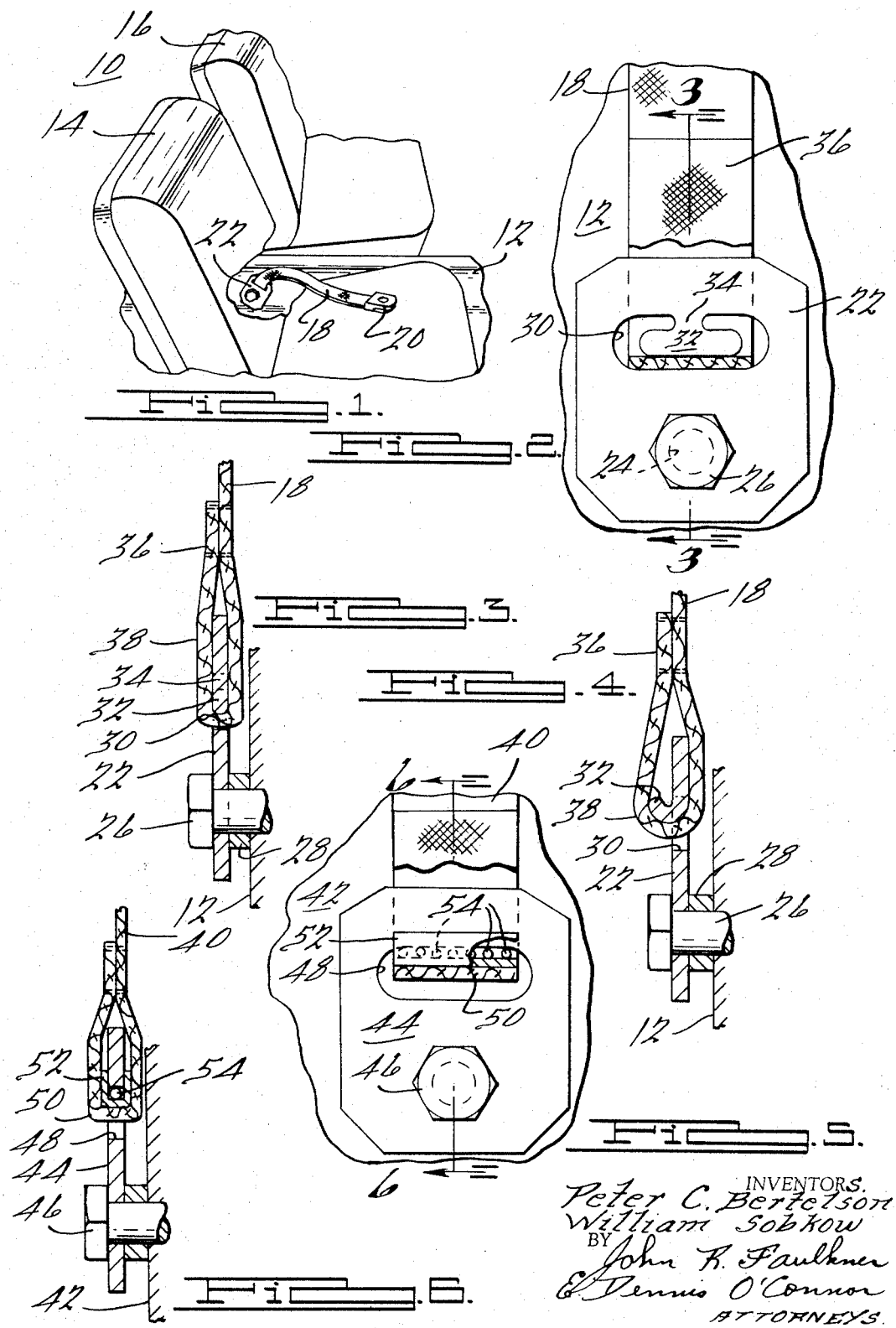
INVENTORS.
Peter C. Bertelson
William Sobkow
BY John R. Faulkner
Dennis O'Connor
ATTORNEYS.

United States Patent Office 3,428,362
Patented Feb. 18, 1969

3,428,362
SEAT BELT UTILIZATION INDICATOR
Peter C. Bertelson, Franklin, and William Sobkow,
Livonia, Mich., assignors to Ford Motor Company,
Dearborn, Mich., a corporation of Delaware
Filed Oct. 16, 1967, Ser. No. 675,545
U.S. Cl. 297—385                                    8 Claims
Int. Cl. B60r 21/10; G01d 21/00; A44c 5/18

ABSTRACT OF THE DISCLOSURE

A device for use in conjunction with a motor vehicle passenger restraint belt segment that, when visually inspected, will indicate if a seat belt assembly was utilized during a vehicle collision. The device includes means that are deformed by the tensioning force applied to a utilized belt under collision conditions.

Background of the invention

Current technical studies in the motor vehicle safety art indicate the need for statistical data concerning the incidence of passenger restraining belt utilization during motor vehicle accidents. Government agencies, insurance underwriters and vehicle manufacturers have encountered obvious difficulties in attempts to compile such data.

An object of this invention is to provide an easily manufactured and inexpensive device for use with a vehicle passenger restraining belt segment that will indicate, during a post-collision visual inspection, whether or not a belt assembly, of which the belt segment is a part, was in use during the collision. Also, this device may be constructed so that the magnitude of the tensioning force applied to the belt, as the belt restrains movement of the passenger during rapid vehicle deceleration, easily may be ascertained.

Summary of the invention

A seat belt utilization indicator device constructed in accordance with this invention is adapted for use in a motor vehicle having structural elements partially defining a passenger compartment. This device includes a seat belt mounting member secured to one of said structural elements and having an aperture extending therethrough. A seat belt segment, having a closed loop formed from a part thereof is positioned so that a portion of the loop extends through the aperture in the mounting member. Deformable means are positioned in the aperture beween the seat belt loop and a side wall of the aperture whereby, upon a tensioning force being applied to the seat belt segment as it restrains the body of a vehicle passenger during periods of rapid vehicle deceleration, the deformable means will be deformed.

Description of the drawing

FIGURE 1 is an isometric view of a portion of a motor vehicle passenger compartment including a passenger restraining seat belt segment mounted in accordance with a first embodiment of this invention;

FIGURE 2 is a detailed view of the mounting structure of the lap belt segment illustrated in FIGURE 1;

FIGURE 3 is a sectional view taken along the lines 3—3 of FIGURE 2;

FIGURE 4 is a view similar to FIGURE 3 illustrating a lap belt segment mounting structure following a vehicle collision during which said belt segment was utilized to restrain movement of the vehicle passenger;

FIGURES 5 is a view similar to FIGURE 2 but illustrating a second embodiment of this invention; and FIGURE 6 is a sectional view taken along the lines 6—6 of FIGURE 5.

Detailed description of the invention

Referring now in detail to the drawing and in particular to FIGURES 1 to 4 illustrating a first embodiment of seat belt utilization indicator constructed in accordance with this invention, the numeral 10 denotes generally a portion of the interior of a motor vehicle. The interior passenger compartment is partially defined by floor member 12 that is operatively connected to the main structural members of the vehicle. A pair of seats 14 and 16 are secured to floor member 12. A seat belt segment 18, having mounted on one end thereof a buckle 20 adapted to interconnect segment 18 with a cooperating segment to restrain a vehicle passenger seated on seat 14, is secured to floor 12 by a mounting member 22. It is to be understood that a second seat belt segment similar to segment 18 but not shown is secured to floor 12 proximate seat 16.

It may be seen from FIGURES 2 to 4 that mounting member 22 is an essentially planar plate having a hole 24 formed therethrough. A fastener 26 extends through hole 24 and secures mounting member 22 to floor 12. A washer-spacer 28 surrounds the shaft of fastener 26 and provides that mounting member 22 is spaced from floor 12.

A second aperture 30 extends through mounting member 22 and has a generally elongated shape. A tab 32, integrally formed with the main body of mounting member 22 and connected thereto by a neck portion 34 of reduced cross-section, extends into aperture 30 and lies in the plane of mounting member 22.

One end of the seat belt segment 18 is doubled back and secured against a portion of the seat belt segment 18 to form a loop 38. In forming loop 38, seat belt segment 36 is passed through aperture 30 so that segment 18 is secured to mounting member 22, with a portion of loop 38 bearing against tab 32.

Mounting member 22 and integrally formed tab 32, connected to the mounting member by neck 34, are formed from a material having a predetermined resistance to inelastic deformation. This resistance can be varied by varying the cross-sectional area of neck portion 34.

It readily may be appreciated that when belt segment 18 is joined by means of buckle 20 to a cooperating belt segment, anchored to floor 12 on the opposite side of seat 14 the two belt segments may be used to secure a motor vehicle passenger in seat 14 against movement during periods of rapid vehicle deceleration as occur during an accident. During such vehicle deceleration, a tensioning force will be applied to segment 18 by the body of the occupant of seat 14 as this body moves forward against the constraining force of seat belt 14. This tensioning force is transmitted along the length of segment 18 and applied to tab 32.

If the tensioning force transmitted by seat belt segment 18 to tab 32 exceeds the load carrying capabilities of tab 32, deformation of this tab into a position such as is shown in FIGURE 4 is accomplished. The resistance of tab 32 to deformation easily may be predetermined so that ordinary seat belt loads, as occurred during motor vehicle accidents, may be sufficient to deform said tab.

The above-mentioned apparatus may be constructed so that it may be determined by a post-accident visual inspection of mounting member 22 whether or not the occupant of seat 14 was utilizing seat belt segment and a cooperating seat belt segment at the time the accident occurred. Furthermore, the resistance to deformation of tab 32 may be computed in such detail that a post-accident inspection of magnitude of deformation of the tab indicates the magnitude of the tensioning force applied along the length of seat belt segment 18. This force corresponds, of course, to the load applied to the body of the vehicle passenger by the restraining belt assembly.

FIGURES 5 and 6 illustrate a second embodiment of seat belt utilization indicator constructed in accordance with this invention. In these figures, the numeral 40 represents a seat belt segment operatively secured to a motor vehicle passenger compartment floor 42 by means of a mounting member 44. A fastener 46 secures mounting member 44 to floor member 42. An oblong aperture 48 is formed through mounting member 44. A loop 50 is formed from the material of belt 40 and a portion of said loop passes through aperture 48. A U-shaped cage 52 is positioned within aperture 48 such that the arms of cage 52 overlie the body of mounting member 44 on opposite sides thereof. This orientation of cage 52 allows said cage to move relative to mounting member 44 as the arms of the cage 52 slide along the outer surfaces of said mounting member.

Positioned between the surface of cage 52 and a side wall of aperture 48 are a plurality of balls 54. These balls may be formed from a soft metal such as aluminum so that their resistance to deformation is known. It may be seen from FIGURE 5 that balls 54 cannot escape from the enclosure defined by cage 52 and the side wall of aperture 48 due to the curvature of said side walls that effectively retain balls 54 in the positions illustrated.

The embodiment of the device illustrated in FIGURES 5 and 6 functions in a manner similar to the embodiment of the invention illustrated in FIGURES 1 to 4. During a period of rapid vehicle deceleration when seat belt segment 40 is used to restrain a vehicle passenger in said passenger seat, the tensioning force arising along the length of belt segment 40 will be transmitted to cage 52 causing an upward movement of cage 52, as viewed in FIGURE 6, if said tensioning force is sufficient to cause deformation of balls 54. Following a motor vehicle accident, an inspection of the position of cage 52 and the condition of balls 54 thus will indicate if the seat belt assembly was utilized at the time of the accident. The magnitude of movement of cage 52 and the magnitude of deformation of balls 54 also may be used as an indicator of the magnitude of the tensioning force that was applied to cage 52 along belt segment 40.

It thus may be seen that this invention provides a device for indicating, upon a visual inspection thereof, whether or not a vehicle seat belt was utilized as a passenger restraint during a period of rapid vehicle deceleration as occurs during a vehicle accident. Also, the device of this invention may be used to indicate the magnitude of the tensioning force occurring along the length of a seat belt segment when said segment is used for passenger restraint during a vehicle accident. Both embodiments of this invention conveniently may be manufactured and included in motor vehicles during the assembly of the latter or may be installed on motor vehicles now in use.

It is to be understood that this invention is not limited to the exact construction illustrated and described above or the abstract preceding this specification, but that various changes and modifications may be made without departing from the spirit and scope of the invention as defined in the following claims.

We claim:

1. A device for indicating seat belt utilization during rapid deceleration of a motor vehicle having structural elements partially defining a passenger compartment, said device comprising: a seat belt mounting member secured to one of said structural elements, said mounting member having an aperture extending therethrough, a seat belt segment having a closed loop formed from a part thereof, a portion of said loop extending through said aperture and surrounding a side wall of said aperture, and deformable means positioned in said aperture between said loop and said side wall of said aperture.

2. The device of claim 1, in which said deformable means will be deformed upon the application of a tensioning force of sufficient magnitude to said segment.

3. The device of claim 2, wherein said mounting member is substantially planar, said deformable means comprising a tab formed integrally with said mounting member and lying in the plane of said mounting member when said tab is in the undeformed condition.

4. The device of claim 2, including a cage positioned in said aperture and cooperating with a side wall of said aperture to define a chamber, said deformable means comprising at least one metal ball positioned in said chamber, said loop being in contact with said cage and said cage movable relative to said aperture side wall to compress said ball.

5. In a motor vehicle having structural elements partially defining a passenger compartment and a seat belt segment located within said compartment and secured to one of said structural elements, a device for indicating that a tensioning force exceeding a predetermined magnitude has been applied to said belt segment, said device including a belt segment mounting member secured to said one structural element and having an aperture formed therethrough, said mounting member having an integrally formed tab thereon extending into said aperture, said tab having a predetermined resistance to inelastic deformation, a portion of said belt segment forming a closed loop extending through said aperture and bearing on said tab, whereby a tensioning force of sufficient magnitude applied to said belt will cause deformation of said tab.

6. The device of claim 5, wherein said mounting member is substantially planar and said tab lies in the plane of said mounting member in the undeformed condition.

7. In a motor vehicle having structural elements partially defining a passenger compartment and a seat belt segment located within said compartment and secured to one of said structural elements, a device for indicating that a tensioning force extending a predetermined magnitude has been applied to said belt segment, said device including a belt segment mounting member secured to said one structural element and having an aperture formed therethrough, a U-shaped cage movably positioned within said aperture with the arms of the U overlapping a portion of said mounting member, said cage and one side wall of said aperture thereby defining a chamber therebetween, deformable means positioned within said chamber, a portion of said belt segment forming a closed loop and extending through said aperture and bearing on said cage, whereby a belt tensioning force of sufficient magnitude applied to the end of said belt remote from said loop will urge said cage toward said one side wall to deform said deformable means.

8. The device of claim 7, wherein said deformable means comprises at least one soft metal ball.

References Cited
UNITED STATES PATENTS

| | | | |
|---|---|---|---|
| 2,190,932 | 2/1940 | Corel | 24—265 |
| 2,825,297 | 3/1958 | Harrison | 116—114 |
| 3,106,989 | 10/1963 | Fuchs | 297—386 X |
| 3,126,072 | 3/1964 | Johansson | 297—386 X |
| 3,198,288 | 8/1965 | Presunka | 297—386 |
| 3,311,412 | 3/1967 | Kelly | 297—385 |
| 3,361,475 | 1/1968 | Villiers | 297—386 |

JAMES T. McCALL, *Primary Examiner.*

U.S. Cl. X.R.

116—114; 24—265; 280—150